United States Patent
Coen et al.

(10) Patent No.: US 9,832,931 B2
(45) Date of Patent: Dec. 5, 2017

(54) CONTROLLING THE OPERATION OF A SQUARE BALER

(71) Applicant: CNH Industrial America LLC, New Holland, PA (US)

(72) Inventors: Tom Coen, Zemst (BE); Didier O. M. Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/777,891

(22) PCT Filed: Mar. 20, 2014

(86) PCT No.: PCT/EP2014/055606
§ 371 (c)(1),
(2) Date: Sep. 17, 2015

(87) PCT Pub. No.: WO2014/147179
PCT Pub. Date: Sep. 25, 2014

(65) Prior Publication Data
US 2016/0270297 A1 Sep. 22, 2016

(30) Foreign Application Priority Data

Mar. 20, 2013 (BE) .................................. 2013/0179

(51) Int. Cl.
*A01F 15/10* (2006.01)
*A01D 89/00* (2006.01)
(Continued)

(52) U.S. Cl.
CPC ........ *A01F 15/0825* (2013.01); *A01D 89/006* (2013.01); *A01F 15/042* (2013.01); *A01F 15/08* (2013.01); *A01F 15/10* (2013.01)

(58) Field of Classification Search
CPC ...... A01F 15/0825; A01F 15/10; A01F 15/08; A01D 89/00; A01D 89/006
(Continued)

(56) References Cited

U.S. PATENT DOCUMENTS 6,557,336 B2 * 5/2003 Lucand .................. A01D 90/04
56/341
7,331,168 B2 2/2008 Dubois
(Continued)

FOREIGN PATENT DOCUMENTS

DE 4115056 A1 11/1992
DE 102008014998 A1 9/2009

*Primary Examiner* — John G Weiss
(74) *Attorney, Agent, or Firm* — Peter K. Zacharias; Patrick M. Sheldrake

(57) ABSTRACT

A square baler has a baling chamber, a plunger reciprocable at one end of the baling chamber, a pre-compression chamber within which charges of crop are amassed and pre-compressed by a rotor prior to transfer into the baling chamber, and a pickup roller having radially projecting tines for picking up crop from the ground and advancing the crop to the rotor. A torque sensor is connected to at least one tine of the pickup roller to produce an electrical output signal indicative of the torque experienced by the pickup roller, and a processing circuit is operative to estimate the rate of crop flow into the chute by analyzing the electrical output of the torque sensor only at times when the position of the tine lies within a predetermined angular position of the pickup roller.

6 Claims, 2 Drawing Sheets

(51) Int. Cl.
  *A01F 15/08* (2006.01)
  *A01F 15/04* (2006.01)

(58) Field of Classification Search
  USPC .................................. 56/10.2 G, 10.2 H, 432
  See application file for complete search history.

(56) References Cited

U.S. PATENT DOCUMENTS

| | | | |
|---|---|---|---|
| 7,404,283 B2 * | 7/2008 | Viaud | A01D 41/148 |
| | | | 56/15.5 |
| 9,357,709 B2 * | 6/2016 | Waechter | A01F 15/08 |
| 9,468,147 B2 * | 10/2016 | Waechter | A01F 15/08 |
| 2001/0042362 A1 * | 11/2001 | Scarlett | A01F 15/08 |
| | | | 56/10.2 G |
| 2015/0373919 A1 * | 12/2015 | Verhaeghe | A01F 15/0825 |
| | | | 100/35 |
| 2016/0088798 A1 * | 3/2016 | Lang | A01F 15/0825 |
| | | | 56/341 |
| 2016/0235007 A1 * | 8/2016 | Hoffmann | A01F 15/085 |

* cited by examiner

CONTROLLING THE OPERATION OF A SQUARE BALER

This application is the US National Stage filing of International Application Serial No. PCT/EP2014/055606, filed on Mar. 20, 2014 which claims priority to Belgium Application BE2013/0179, filed Mar. 20, 2013, each of which is hereby incorporated by reference in its entirety.

FIELD OF THE INVENTION

The present invention relates to a square baler and is concerned with controlling the operation of the baler to produce well formed bales of uniform density.

BACKGROUND OF THE INVENTION

In a square baler, crop is picked up from the ground by means of a rotary pickup having radially projecting tines. The crop picked up from the ground is advanced towards a rotor arranged at the lower end of an arcuate chute. The rotor serves to compress the crop into the arcuate chute, the latter acting as a pre-compression chamber.

When a plunger reciprocating in a baling chamber of the baler is at the bottom dead centre position of its reciprocating cycle, a stuffer displaces the crop present in the pre-compression chamber into the baling chamber, the crop becoming a slice of the bale in the process of being formed. Once the bale in the baling chamber has reached a certain size, twine is wrapped around the bale and knotted to form a finished bale. The finished bale remains in the baling chamber while the next bale is being formed and is eventually discharged from the rear end of the baler.

As square balers are well known and documented, it is believed that the above brief description will suffice for an understanding of the present invention.

In order to produce well formed bales of uniform density, it is desirable to ensure that the density of the crop in the pre-compression chamber is at a desired level when a stuffer cycle is initiated. The stuffer cycle must of course be synchronised with the movement of the plunger of the baling chamber and can only take place at the end of a whole number of cycles of the plunger in the baling chamber.

If, for example, a stuffer cycle is performed every three cycles of the plunger in the baling chamber, it would be undesirable for the crop density in the pre-compression chamber to reach the desired level either after two and half plunger cycles or three and half plunger cycles. In the former case, the crop density would be too great by the time the crop is transferred to the baling chamber. In the latter case, if a stuffer cycle is initiated by a pressure sensor in the pre-compression chamber, the stuffer cycle could be delayed by a complete plunger cycle.

OBJECT OF THE INVENTION

It is therefore desirable to be able to more accurately estimate crop flow rate into the pre-compression chamber in order to be able to ensure that the crop density attains a desired level at the time that it is transferred into the baling chamber.

SUMMARY OF THE INVENTION

According to the present invention, there is provided a square baler, comprising a baling chamber, a plunger reciprocable at one end of the baling chamber, a pre-compression chamber within which charges of crop are amassed and pre-compressed by a rotor prior to transfer into the baling chamber, and a pickup roller having radially projecting tines for picking up crop from the ground and advancing the crop to the rotor, characterised by a torque sensor connected to at least one tine of the pickup roller to produce an electrical output signal indicative of the torque experienced by the tine, and a processing circuit operative to estimate the rate of crop flow into the chute by analysing the electrical output of the torque sensor only at times when the position of the tine lies within a predetermined angular range.

If one were to measure the load on the entire pickup roller, it would not be indicative solely of the rate of crop flow because the tines would at some stage in each cycle scrape along the ground and the drag they experience would depend on such factors as the ride height of the pickup roller and the hardness of the ground. Furthermore, crop can pile up ahead of the rotor when the pre-compression chamber is full to offer resistance to the tines of the pickup roller, whereas no such resistance will be met while the pre-compression chamber is relatively empty.

In the present invention, such problems are avoided by measuring the torque on a tine, or more preferably a tine bar carrying a plurality of tines, only at times when the sole bending moment acting on the tines is the weight of the crop, Thus, the processing circuit can disregard the load measured on the tines when they are vertical and therefore dragging on the ground or pushing crop towards the rotor, and only take note of the measured load when the tines are horizontal and carrying the weight of the crop that they have picked up from the ground.

The position of the tine(s) can be determined in a variety of ways, most simply by the use of a shaft encoder associated with the axle of the pickup roller. The shaft encoder need not be precise and may for example take the form of one or more magnets mounted on the pickup roller that activate(s) one or more stationary Hall sensor(s) on the support frame as the pickup roller rotates.

The rate at which crop is picked up will vary with the density of the crop on the ground and with the speed of travel of the baler. If the crop is sparse, then the baler can be moved faster to achieve the desired flow rate to reach the desired crop density in the pre-compression chamber just as the plunger of the baling chamber reaches it bottom dead centre position. The reading from the crop flow sensor may therefore be used to provide the operator with advice on when to increase or decrease the speed of the baler.

In addition to using the crop flow rate to set a recommended baler speed, it may be used to vary the volume of the pre-compression chamber. The pre-compression chamber may have a movable wall to vary its volume and this provides a correction parameter that has a faster reaction time than the speed of the baler. If the crop flow rate is likely to result in excessive crop density in the pre-compression chamber, then its size may be increased relatively rapidly to ensure that a uniform crop density is admitted into the baling chamber in each cycle, even though the mass of the crop may vary between slices.

BRIEF DESCRIPTION OF THE DRAWING

The invention will now be further described, by way of example, with reference to the accompanying drawings, in which.

DETAILED DESCRIPTION OF THE EMBODIMENTS

Figure 1:
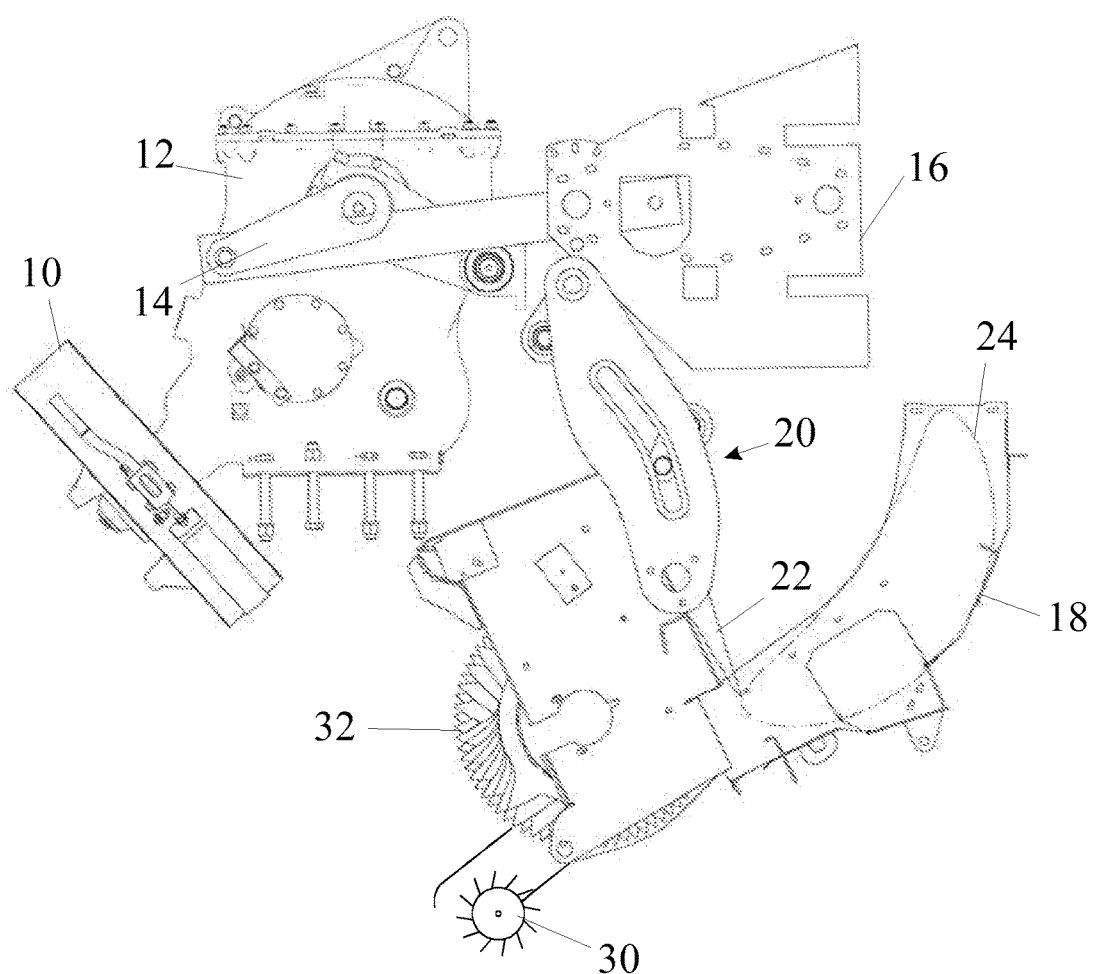
FIG. 1 is a schematic representation of the moving parts of a square baler.

FIG. 1 shows a flywheel 10 that is connected by an input shaft to the power takeoff shaft of a tractor (not shown). The flywheel drives a gearbox 12 that serves to rotate a crank arm 14 to cause reciprocating movement of a plunger 16. The plunger 16 reciprocates within a baling chamber (not shown) to compress slices of crop that are introduced into the baling chamber by means of a pre-compression chamber 18. The transfer of crop from the pre-compression chamber 18 to the baling chamber is effected by a stuffer mechanism 20, also driven by the gearbox 12, the end of a stuffer arm 22 following a kidney shaped path represented by a dotted line 24 in FIG. 1. As so far described, all the components are conventional and are operated in a conventional manner.

The present invention is concerned only with ensuring that the crop amassed in the pre-compression chamber 18 has a desired density at the commencement of a stuffer cycle. In order to achieve this objective, it is necessary to measure the flow rate of crop into the pre-compression chamber 18.

The crop is introduced into the pre-compression chamber by a pickup roller 30 that has radially projecting tines. Crop picked up from the ground by the tines is advance towards a powered rotor 32 that may serve as a chopper but the primary function of which is to compress the crop into the pre-compression chamber 18.

Figure 2:
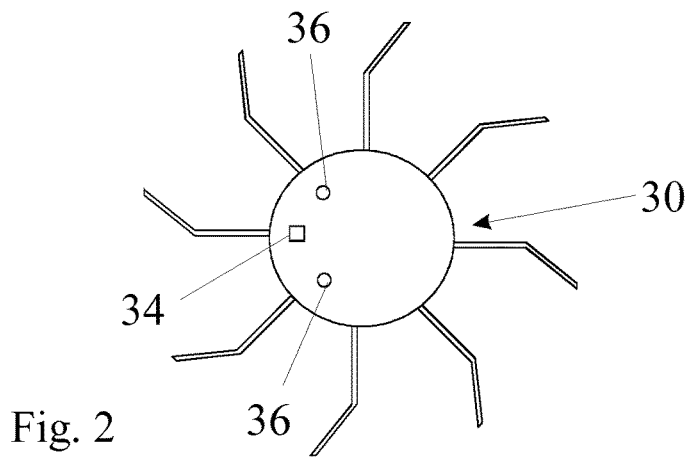
FIG. 2 is a schematic representation of a pickup roller.

In order to measure the flow rate, a load cell 34 (see FIG. 2), serving as a torque sensor, is mounted on at least one of the tine bars from which the individual tines of the pickup roller project. The weight of the crop when the tines are in a horizontal position applies a torque to the tine bar, which is measured by the load cell 34 to indicate the mass of crop that has been raised from the ground.

The torque applied to the bar is dependent upon the angular position of the pickup roller. While the tines are scraping along the ground, the torque on the tine bar will depend on the hardness of the ground and the ride height of the pickup roller. Furthermore when the tines are pointing vertically upwards, they are not acted upon by the weight of the crop but may encounter resistance from crop that has piled up between the pickup roller and the compression rotor.

In order to achieve a measurement that is indicative of the crop flow rate, the output of the load cell 34 is analysed only at times when the torque on the tine bars is affected only by the mass of the crop that has been raised from the ground. This may in some embodiments of the invention be achieved by the use of a shaft encoder 40 measuring the angle of the pickup roller but, alternatively, magnets 36 may be provided on the pickup roller that activate stationary Hall effect switches to indicate the commencement and termination of windows during which the output of the load cell (34) should be analysed.

It is possible to estimate the mass of crop carried by only one of the tine bars and to extrapolate for the remaining tine bars or to measure the mass of crop carried by all the tine bars.

From a knowledge of the weight of crop carried by each tine bar and its rate of rotation, it is possible for a processor to determine the rate at which crop is being fed into the pre-compression chamber 18 by the rotor 32.

Figure 3:
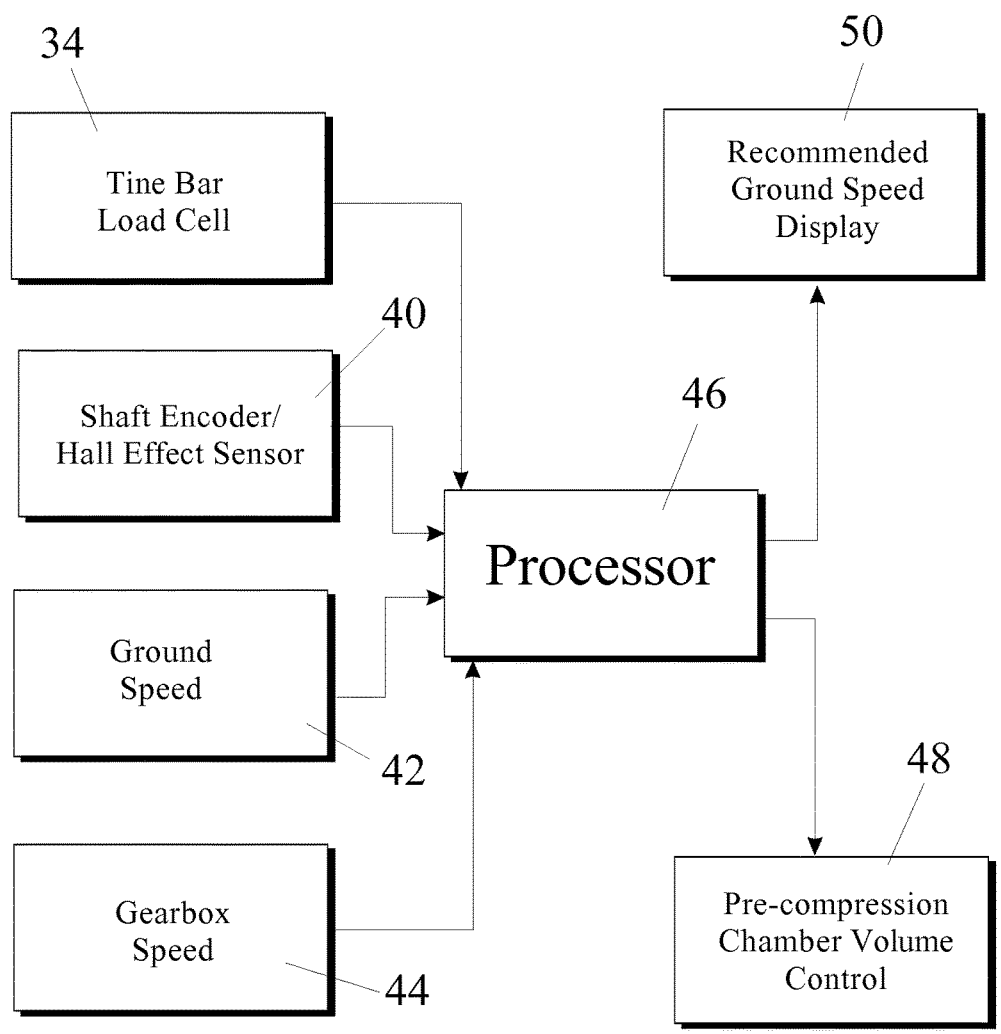
FIG. 3 is a schematic diagram of circuitry for analysing the output of the torque sensor connected to the tine bar in FIG. 2.

Thus, in FIG. 3, the output of the load cell 34 is supplied to a digital processor 46 that is suitably programmed and connected additionally to receive signals from a shaft encoder 40 or the Hall effect sensors, as well as ground speed 42 and gearbox speed signals 44. The gearbox speed signal is used to determined the duration of the reciprocation cycle of the plunger 16.

The time that it should take for the pre-compression chamber to be filled with crop up to a density within a desired range should coincide with a whole number multiple of the time it takes for the plunger 16 to perform a complete cycle of reciprocation. This is because a stuffer cycle can only be performed when the plunger 16 is at its bottom dead centre position, in which position the plunger 16 uncovers an opening that connects the pre-compression chamber 18 to the baling chamber. From a knowledge of the duration of the reciprocation cycle of the plunger 16, the processor 46 can determine whether the crop pickup rate needs to be increased or decreased to achieve a crop density within a desired range at the correct time.

The rate at which crop is picked up from the ground is of course dependent upon the speed at which the baler has driven over the ground. In the preferred embodiment, the processor 46 can provide advice to the operator of the baler through a display screen 50 to display to the operator a recommended ground speed such that the operator can increase or decrease the ground speed in order to improve the quality of the finished bales.

Such speed control of the baler does not have a very rapid response, as the operator cannot be expected to accelerate or brake sharply to vary the crop density in the pre-compression chamber. It is therefore alternatively possible to vary the volume of the pre-compression chamber 18 to achieve slices of different thickness but of the desired density. It is known that the pre-compression chamber may have a movable wall and in the embodiment of the invention shown in FIG. 3 such a movable wall is positioned by means of closed loop control circuit 48 to maintain a desired density. The processing circuit is connected to the control circuit 48 that is configured to vary the volume of the pre-compression chamber. Whereby, the volume of the pre-compression chamber is increased when the density is estimated to be too high and decreased when the predicted density is estimated to be too low.

The invention claimed is:

1. A square baler, comprising:
    a baling chamber, a plunger reciprocable at one end of the baling chamber, a pre-compression chamber within which charges of crop are amassed and pre-compressed by a rotor prior to transfer into the baling chamber;
    a pickup roller comprising at least one tine bar having radially projecting tines for picking up crop from the ground and advancing the crop to the rotor;
    a torque sensor connected to the at least one tine bar of the pickup roller to produce an electrical output signal indicative of a torque experienced by the at least one tine bar of the pickup roller; and
    a processing circuit operative to estimate a rate of crop flow into the pre-compression chamber by analyzing the output signal of the torque sensor only at times when a position of at least one of the radially projecting tines lies within a predetermined angular position of the pickup roller, wherein the predetermined angular position of the pickup roller is such that the position of the at least one of the radially projecting tines is substantially horizontal and the torque experienced by the at least one tine bar is affected only by a weight of the crop that has been raised from the ground.

2. A square baler as claimed in claim 1, wherein a shaft encoder is associated with an axle of the pickup roller.

3. A square baler as claimed in claim 1, wherein the position of the at least one tine is determined by the use of one or more magnets mounted on the pickup roller interacting with one or more Hall effect sensors on a support frame.

4. A square baler as claimed in claim 1, wherein the processing circuit is connected to a display unit for displaying to an operator a recommended ground speed.

5. A square baler as claimed in claim 1, wherein the torque sensor is a load cell.

6. A method of estimating a rate at which crop is picked up from the ground by a square baler that comprises a baling chamber, a plunger reciprocable at one end of the baling chamber, a pre-compression chamber within which charges of crop are amassed and pre-compressed by a rotor prior to transfer into the baling chamber, and a pickup roller having radially projecting tines for picking up crop from the ground and advancing the crop to the rotor, the method comprising:

measuring a torque experienced by a tine bar of the pickup roller by a torque sensor; and analyzing an output signal of the torque sensor by a processing circuit only at times when a position of at least one of the radially projecting tines lies within a predetermined angular position of the pickup roller to determine a parameter of the output signal of the torque sensor that is indicative of a rate of crop flow into the pre-compression chamber, wherein the predetermined angular position of the pickup roller is such that the position of the at least one of the radially projecting tines is substantially horizontal and the torque experienced by the tine bar is affected only by a weight of the crop that has been raised from the ground.

\* \* \* \* \*